United States Patent
Ludvigsen et al.

(10) Patent No.: US 8,179,999 B2
(45) Date of Patent: May 15, 2012

(54) DECODING OF BLOCKS IN RADIO COMMUNICATIONS

(75) Inventors: Jakob Ludvigsen, Hvidovre (DK); Vesa Jukka Savela, Tampere (FI)

(73) Assignee: Nokia Corporation, Espoo (FI)

( * ) Notice: Subject to any disclaimer, the term of this patent is extended or adjusted under 35 U.S.C. 154(b) by 950 days.

(21) Appl. No.: 12/188,762

(22) Filed: Aug. 8, 2008

(65) Prior Publication Data

US 2010/0034319 A1    Feb. 11, 2010

(51) Int. Cl.
*H04L 27/06* (2006.01)
*H03D 1/00* (2006.01)

(52) U.S. Cl. ....... 375/340; 375/316; 375/324; 455/3.02; 455/39

(58) Field of Classification Search ............ 375/260, 375/316, 324, 340; 455/3.02, 39, 334
See application file for complete search history.

(56) References Cited

U.S. PATENT DOCUMENTS

| | | | |
|---|---|---|---|
| 5,570,369 A | 10/1996 | Jokinen | |
| 5,594,797 A * | 1/1997 | Alan ar a et al. | 380/28 |
| 5,930,706 A | 7/1999 | Raith | |
| 6,477,680 B2 * | 11/2002 | Mujtaba | 714/795 |
| 6,765,893 B1 | 7/2004 | Bayley | |
| 2001/0023184 A1 | 9/2001 | Kalveram et al. | |
| 2008/0311947 A1 * | 12/2008 | Soerensen et al. | 455/522 |

FOREIGN PATENT DOCUMENTS

EP    1 389 883 A1    2/2004

\* cited by examiner

*Primary Examiner* — Ted Wang
(74) *Attorney, Agent, or Firm* — Squire Sanders (US) LLP

(57) ABSTRACT

Apparatuses and methods are disclosed for decoding expected block messages transmitted as radio signals over an air interface in interleaved bursts from a shorter received burst. A method for detecting certain expected messages from received bursts is described, comprising: receiving a one to m bursts of n bursts of an interleaved block message; retrieving stored values for the expected m+1 to n bursts of the interleaved block message; forming an expected interleaved block message; deinterleaving and decoding the expected block message; determining from an error checking whether the expected block message is valid; and if valid, indicating the expected block message was received after receiving only the m bursts. Apparatuses are described for a receiver configured to detect an expected message after receiving m transmitted bursts of an interleaved n burst block message. The expected message may be an empty paging channel or broadcast message.

32 Claims, 9 Drawing Sheets

US 8,179,999 B2

DECODING OF BLOCKS IN RADIO COMMUNICATIONS

TECHNICAL FIELD

The present invention is directed, in general, to radio frequency (RF) communication systems and, more particularly, to a system and method for decoding blocks.

BACKGROUND

As wireless communication systems such as cellular telephones, satellite and microwave communication systems become widely deployed and continue to attract a growing number of users, there is a pressing need to accommodate a large and variable number of communication subsystems transmitting a growing volume of data with a fixed resource such as a fixed channel bandwidth accommodating a fixed data packet size. Traditional communication system designs employing a fixed resource (e.g., a fixed data rate for each user) have become challenged to provide high, but flexible, data transmission rates in view of the rapidly growing customer base. Various standards and interoperability requirements are developed on an ongoing basis for present and future communications networks. The use of standards ensures that equipment available in the marketplace operates correctly with equipment from a variety of manufacturers and service providers, and in a variety of locales so that to a user carrying the equipment from place to place and even from country to country, the use of the equipment remains convenient and the details of the operations of the network are virtually transparent to the user.

For example, the third Generation Partnership Project Long Term Evolution ("3GPP LTE") is the name generally used to describe an ongoing effort across the industry to improve the Universal Mobile Telecommunications System ("UMTS") for mobile communications. The improvements are being made to cope with continuing new requirements and the growing base of users. Goals of this broad-based project include improving communication efficiency, lowering costs, improving services, making use of new spectrum opportunities, and achieving better integration with other open standards, and backwards compatibility with some existing infrastructure that is compliant with earlier standards. The project envisions a packet-switched communications environment with support for such services as Voice over Internet Protocol ("VoIP") and Multipedia Broadcast Multicast Service ("MBMS"). MBMS may support services where base stations transmit to multiple user equipment simultaneously, such as mobile televisions or radio broadcasts, for example. The 3GPP LTE project is not itself a standard-generating effort, but will result in new recommendations for standards for the UMTS.

The UMTS Terrestrial Radio Access Network ("UTRAN") includes multiple Radio Network Subsystems ("RNS"); each of which may contain at least one Radio Network Controller ("RNC"). However, it should be noted that the RNC may not be present in the actual implemented systems incorporating Long Term Evolution ("LTE") or extended UTRAN ("e-UTRAN"). LTE may include a centralized or decentralized entity for control information. In UTRAN operation, each RNC may be connected to multiple Node Bs, which are the UMTS' counterpart to Global System for Mobile Communications ("GSM") base stations. In E-UTRAN systems, the eNode B may be, or is, connected directly to the access gateway ("aGW," sometimes referred to as the services gateway "sGW"). Each Node B may be in radio contact with multiple user equipment ("UE") (generally, user equipment includes mobile transceivers or cellular phones, although other devices such as fixed cellular phones, mobile web browsers, laptops, PDAs, MP3 players, and gaming devices with transceivers may also be UE) via the radio Uu interface. In this document, the abbreviation for user equipment ("UE") will be synonymous with the abbreviation for mobile station ("MS"), and MS will be used primarily. Mobile stations may also be cellular phones, PDAs, MP3 players, mobile web browsers, mobile PCs and the like.

The wireless communication systems as described herein are applicable to, as non limiting examples, existing and future wireless systems, such as GSM, 3G, 3.5G, 4G etc., extended GSM, IMT-A, or future wireless communications systems.

Messages in these modern communications systems are packets formed in frames, blocks and bursts. The bursts may contain interrelated data bits that have been intentionally reordered by a process called "interleaving". This reordering of bits means that no single burst of, for example, a four burst paging message, has a complete set of consecutive message bits within it. Instead, the consecutive bits have been spread out over several bursts. To receive the entire message, a receiver has to collect all four bursts and "deinterleave"— reorder—the received bits in a predetermined way. The interleaving is part of the transmission scheme and aids error detection and error correction using forward error correction (FEC) and cyclic redundancy check (CRC). In this manner even a partially garbled transmission may often be correctly received, or at least, the error detected at the receiver so that a re-transmission may be requested. For example, if one of the bursts is received incorrectly, enough information from the original data string may remain in the other received bursts to perform error detection and correction, and decode the message correctly. This can often occur without the need for retransmission.

As a method of improving battery and power performance in such systems, approaches to reduce power consumption in certain modes have been proposed. Generally, the approach is to maintain the mobile station (hereinafter "MS") in a low power or "sleep" state as much as possible when in the idle mode. In the "sleep" state, the power used, especially to the radio functions of the device, is limited to the minimum needed for proper operation, and importantly few RF circuits are powered.

The receiver in the MS still expends much of its idle mode battery power receiving the broadcast or paging messages. Periodically, the MS leaves sleep mode and enters an active idle mode where the device monitors, for example, the paging channel (PCH) and broadcast (BCCH) channels.

A continuing need exists for an improved and commercially practical message decoding method and apparatus to provide a robust identification of empty paging messages, or other repetitive messages, to enable the MS receiver to return to sleep mode quickly and thereby conserve power.

SUMMARY OF THE INVENTION

These and other problems are generally solved or circumvented, and technical advantages are generally achieved, by advantageous embodiments of the present invention which include methods and apparatuses for detecting an expected block message of n interleaved bursts from a single received burst transmitted over a radio frequency air interface.

According to an exemplary embodiment, a method is provided comprising: receiving m transmitted burst signals from a plurality of n burst signals that form an interleaved block message, wherein n is a positive integer and m is a positive integer of one or greater; retrieving stored expected values for the remaining m+1 to n burst signals that form the n burst interleaved block message; forming an expected interleaved block message; deinterleaving and decoding the expected interleaved block message; determining whether the expected interleaved block message is valid; and if the expected interleaved block message is valid, indicating the expected message was received.

In a further exemplary embodiment, the above described method is provided and further comprising: if the expected interleaved block message is not valid, receiving the remaining n−m transmitted burst signals that form the interleaved block message; deinterleaving the received interleaved block message; and decoding the received interleaved block message.

In yet another exemplary embodiment, the above described methods are provided, wherein receiving m transmitted burst signals comprises receiving a radio frequency (RF) signal over an air interface.

In still another exemplary embodiment, the above described methods are provided wherein receiving m transmitted burst signals comprises receiving a RF signal over an air interface on a paging channel.

In yet another exemplary embodiment, the above described methods are provided wherein the expected interleaved message is an empty paging block message.

In a further exemplary embodiment, the above described methods are provided wherein receiving the m transmitted burst signals comprises receiving a RF signal over an air interface on a broadcast control channel.

In yet another exemplary embodiment, the above described methods are provided wherein the expected interleaved message is a repeated broadcast control channel message.

In a further exemplary embodiment, the above described methods are provided wherein n is a positive integer of at least 2. In still a further embodiment, the above described methods are provided wherein m is a positive integer of one or greater, but less than n.

In yet another exemplary embodiment, the above described methods are provided wherein determining whether the expected interleaved block message is valid further comprises performing a cyclic redundancy check (CRC) on the expected block message.

In yet another exemplary embodiment, the above described method is provided wherein retrieving stored expected values for the remaining n−m burst signals further comprises retrieving stored soft values indicating a probability for each data value.

In still another exemplary embodiment, the methods described above are provided, wherein retrieving stored expected values for the remaining n−m burst signals further comprises: prior to receiving the first transmitted burst signal, receiving an earlier transmitted block message of n interleaved burst signals; determining the soft values for the data in the m+1 to n interleaved burst signals; and storing the soft values for the data in the m+1 to n interleaved burst signals as stored expected values for the n−m burst signals.

In still another exemplary embodiment, a method is provided comprising: receiving m transmitted burst signals from a plurality of n burst signals that form an interleaved block message, wherein n is a positive integer and m is an integer less than n; retrieving stored expected values for the remaining m+1 to n burst signals that form the n burst interleaved block message; forming an expected interleaved block message; deinterleaving and decoding the expected interleaved block message; determining whether the expected interleaved block message is valid; if the expected interleaved block message is valid, indicating the expected message was received; and prior to receiving a first transmitted burst signal, transitioning from a receiver sleep mode where relatively low power is consumed to a receiver idle mode, where power consumption is increased over the sleep mode.

In yet another exemplary embodiment, the above described method is provided and further comprising: if the expected interleaved block message is valid, transitioning from the idle receiver mode to the receiver sleep mode.

In still another exemplary embodiment, the above described method is provided wherein receiving m transmitted burst signals further comprises receiving using a battery powered wireless communications device.

In yet another exemplary embodiment, an apparatus is provided comprising: a receiver configured to receive transmitted block messages comprised of n interleaved bursts, wherein n is a positive integer; a processor configured to detect receipt of m received bursts, where m is an integer of one or greater; the processor configured to retrieve stored expected values for the remaining m+1 to n burst signals that form the interleaved block message; the processor forming an expected interleaved block message; a deinterleaver coupled to the processor and configured to deinterleave the expected interleaved block message; a decoder coupled to the deinterleaver and configured to decode the deinterleaved expected block message; an error check and correction function configured to check the expected block message and indicate to the processor if the expected block message is valid; and if the expected block message is valid, the processor adapted to indicate an expected block message is detected from the first received burst.

In yet another exemplary embodiment, the above described apparatus and further comprising: if the expected block message is not valid, the receiver configured to receive the m+1 to n burst signals that form a block message; the processor further configured to form the received interleaved block message; the deinterleaver coupled to the processor and configured to deinterleave the received block message; and the decoder coupled to the deinterleaver and configured to decode the deinterleaved received block message.

In still another exemplary embodiment, the above described apparatus is provided wherein the error check and correction function is configured to perform a cyclic redundancy check (CRC) on the expected block message.

In yet another exemplary embodiment, one of the above described apparatuses is provided wherein n is a positive integer of at least 2.

In yet another exemplary embodiment, one of the above described apparatuses is provided wherein m is one.

In still another exemplary embodiment, one of the above described apparatuses is provided wherein prior to receiving the first received burst, the receiver is configured to operate in a sleep mode where relatively low power is consumed and the receiver is configured to transition to an idle mode where more power is consumed.

In still another exemplary embodiment, the above described apparatus is provided wherein the processor, if the expected block message is valid, is configured to cause the receiver to transition from idle mode back to sleep mode.

In another exemplary embodiment, one of the above described apparatuses is provided wherein the expected block message comprises an empty paging channel message.

In yet another exemplary embodiment, one of the above described apparatuses is provided wherein the processor is a programmable processor.

In a further exemplary embodiment, one of the above described apparatuses is provided further comprising: memory coupled to the processor configured to store the expected values for the remaining n−m burst signals that form the interleaved block message.

In yet another exemplary embodiment, a method is provided, comprising: receiving an empty paging channel block message in the form of n interleaved bursts transmitted over a radio frequency (RF) air interface; determining soft values for each of the n interleaved bursts; deinterleaving the n interleaved bursts to form a deinterleaved empty paging channel block message; decoding the deinterleaved empty paging channel block message; performing an error check on the empty paging channel block message; and upon identifying the message as an empty paging channel block message, storing the soft values as expected values for the m+1 to n bursts of the n interleaved bursts, where m is one or greater but less than n.

In a further exemplary embodiment, the above described method is provided and further comprising: receiving m transmitted bursts of an n burst interleaved block message; determining the soft values for the received m bursts; retrieving the stored soft values for the m+1 to n burst expected values; forming an expected empty paging channel interleaved message from the soft values for the received m bursts and the retrieved m+1 to n bursts; deinterleaving the expected empty paging channel interleaved message; decoding the deinterleaved expected empty paging channel message; performing an error check on the expected empty paging channel message; and indicating if the expected empty paging channel message is valid.

In yet another exemplary embodiment, the above described method is provided wherein performing the error check comprises performing a cyclic redundancy check (CRC). In a further exemplary embodiment, one of the above described methods is provided wherein n is a positive integer greater than 1. In yet a further exemplary embodiment, one of the above described methods is provided wherein m is a positive integer less than n.

In yet another exemplary embodiment, a computer readable medium is provided storing instructions that, when executed by a programmable receiver, cause the programmable receiver to perform: receiving m transmitted bursts of an interleaved block message; determining the soft values for the received first burst; retrieving stored soft values for the m+1 to n bursts expected values; forming an expected empty paging channel interleaved message from the soft values for the received and the retrieved bursts; deinterleaving the expected empty paging channel interleaved message; decoding the deinterleaved expected empty paging channel message; and performing an error check on the expected empty paging channel message and indicating if the expected empty paging channel message is valid.

In still a further exemplary embodiment, the above described computer readable medium is provided further comprising instructions that, when executed by the programmable receiver, cause the programmable receiver to perform: prior to receiving the first received burst, placing the receiver in a sleep mode where relatively low power is consumed and subsequently transitioning the receiver to an idle mode where more power is consumed.

In yet another exemplary embodiment, a system comprising a transmitter configured to transmit block messages over a radio frequency air interface to receivers in n interleaved bursts; at least one wireless communication device configured to receive the block messages, comprising: a receiver for receiving transmitted block messages comprised of n interleaved bursts; a processor configured to detect receipt of m received bursts; the processor configured to retrieve stored expected values for the remaining m+1 to n burst signals that form the interleaved block message; the processor forming an expected interleaved block message; a deinterleaver coupled to the processor and deinterleaving the expected interleaved block message; a decoder coupled to the deinterleaver and decoding the deinterleaved expected block message; an error check and correction function configured to check the expected block message and indicate to the processor if the expected block message is valid; and responsive to the error check and correction valid indication, the processor indicating an expected block message is detected from the m received bursts.

In yet another exemplary embodiment, an apparatus is provided, comprising: a memory configured to store expected burst values for the m+1 to n bursts of an expected interleaved n burst block message; a processor coupled to the memory configured to retrieve the expected burst values; a receiver configured to receive a transmitted burst of an interleaved block message over a radio frequency air interface; the processor configured to detect the receipt of a m burst signals; the processor configured to combine the values from received m bursts with retrieved stored values for the m+1 to n bursts to form an expected interleaved block message; a deinterleaver configured to deinterleave the expected interleaved block message; a decoder configured to decode the deinterleaved expected block message; an error check and correction function configured to determine if the expected block message is valid; and the processor configured to indicate the expected message is received from decoding the first burst responsive to the valid determination.

In yet another preferred embodiment, the above described apparatus is provided wherein the apparatus is a wireless communications device. In another exemplary embodiment, the above described apparatus is provided wherein the apparatus is an integrated circuit.

The foregoing has outlined rather broadly the features and technical advantages of certain exemplary embodiments of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. For example, some of the terms used in the foregoing, the description that follows and the appended claims are chosen with regards to the presently used terms in the relevant art and being used in draft standards presently in work; changes in these terms and abbreviations over time by use in industry and in standard drafting are contemplated and do not change the scope of the inventions disclosed nor limit the scope of the appended claims. It should also be realized by those skilled in the art that such equivalent constructions do not depart from the spirit and scope of the invention as set forth in the appended claims.

BRIEF DESCRIPTION OF THE DRAWINGS

For a more complete understanding of the invention, and the advantages thereof, reference is now made to the following descriptions taken in conjunction with the accompanying drawing, in which.

The drawings are illustrative, presented for aid in comprehension, and are not drawn to scale.

DETAILED DESCRIPTION

Figure 1:
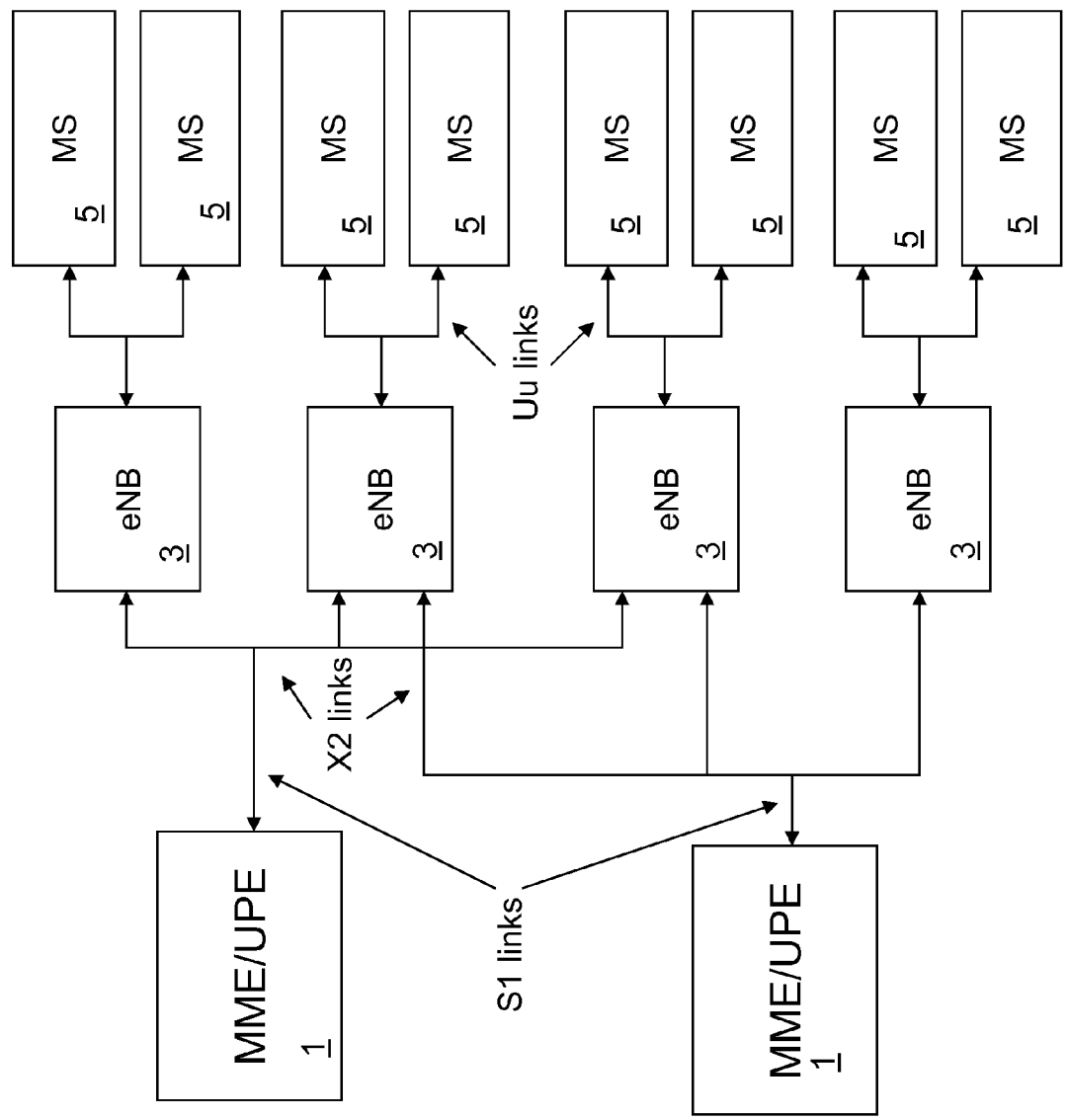
FIG. 1 illustrates a simplified system level diagram of a example radio frequency interface communication system.

Referring initially to FIG. 1, a wireless communication system is depicted that provides an example environment for the application of the principles of the present invention. The wireless communication system may be configured to provide features included in the UMTS terrestrial radio access network ("UTRAN") or the evolved UMTS terrestrial radio access network ("e-UTRAN") services. Mobile management entities ("MMEs") and user plane entities ("UPEs") designated by reference 1 provide control functionality for one or more UTRAN Node B or e-UTRAN node B (designated "eNB", an "evolved node B," referred to hereinafter as a "base station") 3 via an S1 interface or communication link. The base stations communicate via an X2 interface or communication link. The various communication links are typically fiber, microwave, or other high-frequency metallic communication paths such as coaxial links, or combinations thereof. These features may also be extended to future systems currently being contemplated, such as 4G systems.

The base stations further communicate over an air interface with MSs 5, typically a mobile carried by a user. Alternatively, the MSs 5 may be a mobile web browser, text messaging appliance, a laptop with a mobile PC modem, or other user device configured for cellular or mobile services. Thus, communication links (designated "Uu" communication links) coupling the base stations to the user equipment are air links employing a wireless communication signal. For example, the devices may communicate using a known signaling approach such as a 1.8 GHz orthogonal frequency division multiplex ("OFDM") signal. Other radio frequency signals may be used.

The base stations 3 may host functions such as radio resource management (e.g., internet protocol ("IP"), header compression and encryption of user data streams, ciphering of user data streams, radio bearer control, radio admission control, connection mobility control, dynamic allocation of resources to user equipment in both the uplink and the downlink), selection of a mobility management entity at the user equipment attachment, routing of user plane data towards the user plane entity, scheduling and transmission of paging messages (originated from the mobility management entity), scheduling and transmission of broadcast information (originated from the mobility management entity or operations and maintenance), and measurement and reporting configuration for mobility and scheduling. The mobility management entity/user plane entity 1 may host functions such as distribution of paging messages to the base stations, security control, terminating U-plane packets for paging reasons, switching of U-plane for support of the user equipment mobility, idle state mobility control, and system architecture evolution bearer control. The user equipment receives an allocation of a group of information blocks from the base stations.

Figure 2:
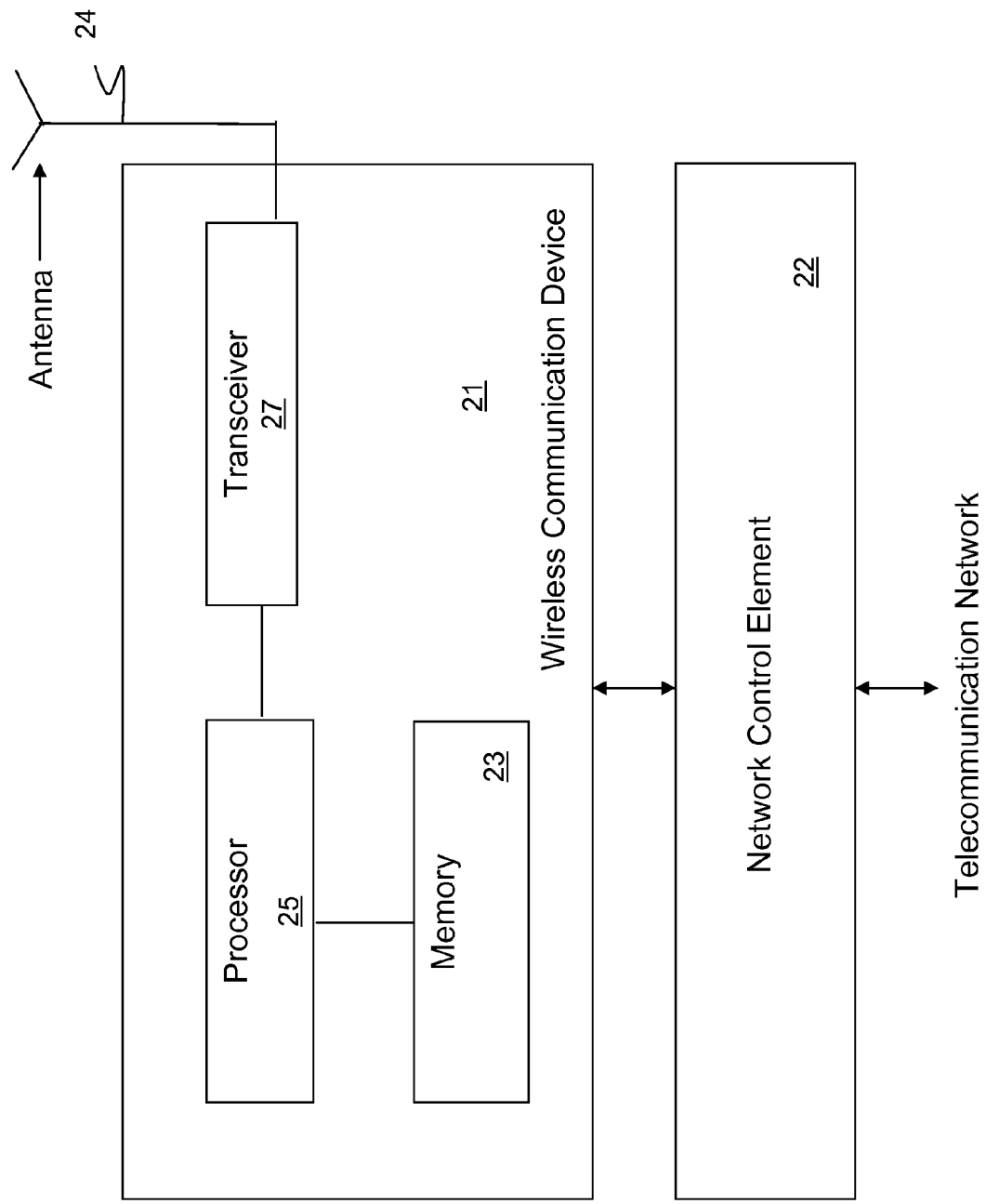
FIG. 2 illustrates in a simple block diagram a typical wireless communication device.

FIG. 2 depicts in a simple block diagram a wireless communication device such as a MS or base station. In FIG. 2, a wireless communication device 21 is shown with typical functions. An antenna 24 such as for a single antenna with interference cancellation (SAIC) transceiver is shown. Transceiver 27 includes transmit, receive, analog and digital signal processing as is known in the art, including encryption, interleaving, burst formation, modulation, digital to analog, duplex filtering, decryption, de-interleaving, demodulation, burst receiving, analog to digital functions which may be provided as hardware, software, or a combination, and which may be implemented as one or more integrated circuits, or modules, or circuit boards. Processor 25 may include any of a microcontroller, microprocessor, DSP, RISC core, central processing unit, and the like, and memory 23 may include programmable memory, volatile and/or non volatile memory, data buffers and so forth. The implementation of these functional blocks may be performed in a variety of ways including producing one or more custom integrated circuits, using application specific integrated circuits, using off the shelf components such as DSPs, DRAMS, EEPROMS, flash and other memory and processor types, and combinations of these.

If the wireless communication device 21 is a base station, for example, it will typically be coupled to a network control element 22 and further to a network. If the device is a MS such as a cellular phone, this connection will not be used.

The air interface communications for the systems are evolving but generally, there is used time division multiplexing (TDM) to divide signal packets into frames, slots and bursts separated by time. Also, the downlink (DL) communications from the base stations to the MSs may be encoded and modulated differently than the uplink (UL) communications from the MSs to the base stations. Different modulation schemes allow a reduction in interference during full duplex communications. Various orthogonal frequency division codes are used, such as Orthogonal Frequency Division Multiplexing (OFDM). Quadrature phase shift keying (QPSK) and the like may be used.

Typically, a variety of channels are defined for communication on the downlink. The base station may provide a more or less constantly transmitted broadcast BCCH. This channel may contain signaling parameters such as transmit power levels to be used, channel frequency, modulation, and other commonly needed information to perform DL and UL signaling in the reception area of the base station. The information on this signal will be repeated periodically. A paging channel is also typically used in the DL direction. This channel is used to locate and address individual communication units that are otherwise in an idle or standby mode within the base station reception area. All MSs in the reception area are required to monitor both of these channels with some regular frequency to see if an action needs to be taken.

Figure 3:
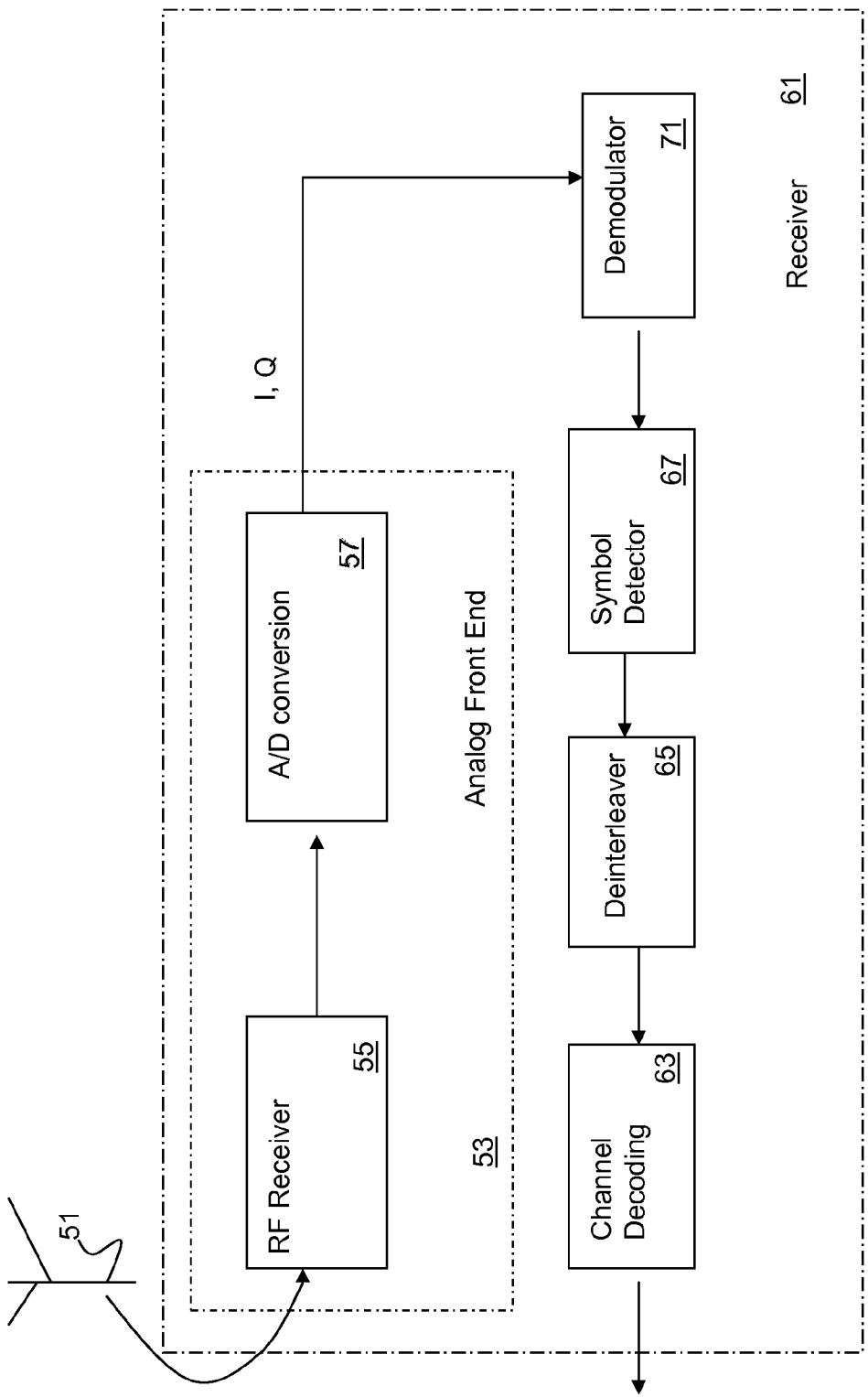
FIG. 3 illustrates in a simple block diagram the receiver portion of a wireless communications device.

FIG. 3 depicts a simple block diagram of the receiver portion of a wireless communications device such as might be used with embodiments of the present invention. In FIG. 3, a receiver 61 is coupled to an antenna 51, which receives RF signals. The analog front end functions 53 may be collected into a single IC or circuit board and include a RF receiver 55 and analog to digital conversion function 57. Often the output signals will be in I, Q form. Once in the digital domain, a digital receiver function is often provided including a demodulator 71, a symbol detector 67, a de-interleaver 65 and channel decoding 63. If the received packets include voice communications, additional processing is performed and the signal is produced as an audio output to a loudspeaker or headset. Data, video, text messages and the like may also be received to support advanced features such as web browsing, mobile television and radio broadcasts and the like.

For the user to effectively rely on a device such as a PDA or cell phone or mobile internet access device, the mobile device must be able to operate for several hours in a communication mode, and for many hours or days in an idle mode. Techniques to conserve power and battery life therefore become very important.

In an "idle" mode, a MS must still receive signals. In GSM, UTRAN, E-UTRAN and like communications systems, several channels must be monitored by an otherwise idle mobile device. For system level parameters, a broadcast control channel or BCCH is transmitted more or less continuously by the base station, at regular intervals. This channel provides the MSs information about the signaling used by the base station. This information includes but is not limited to coding or encryption, modulation schemes, and importantly signals strength from the base station and information about other nearby base stations. The information about other base stations is helpful so the system may support a "hand off" when the MS signaling path to the currently selected base station is no longer viable; which naturally occurs as MSs move within the environment.

The reception of the BCCH signal usually requires that the receiver portion of the MS be powered up at some interval, and the more often the MS receiver has to power up to receive this information, the more power will be consumed. As an example, the broadcast channel BCCH must be transmitted not less than once every 51 TDMA frames, or 3060/13 milliseconds for GSM. The MS listens for the BCCH not less than once every 30 seconds for GSM, as one non-limiting example. Typically, this information is repetitive, that is, since the base station and the parameters associated with it probably have not changed, the BCCH blocks do not change frequently over time.

A MS in idle mode must also be available for incoming messages. For example, another user may place a call over either a wired or wireless telecommunications interface directed to a particular MS device. Other messages such as text messages, pages, video and the like might be directed to the MS. In the event the system has message traffic for the MS, the MS will be addressed in the bursts on the paging channel PCH. A packet paging control channel (PPCH) is sometimes used, this is part of a packet common control channel (PCCCH). An identifier field is sent on the paging channel to locate the addressed MS.

In order to make sure the MS receives these pages timely, the MS will usually burst on at least one subchannel periodically and determine, via some decoding or evaluation operations, whether or not the page is a valid page directed to this particular MS. In some standard implementations, the base station also has to send a paging message even when no mobiles are addressed. This "empty paging message" can be sent quite frequently in certain circumstances, and may even be a majority of the MS received messages during times when no MSs are addressed. As envisioned in the base standards for the communications systems, the MS will usually decode and demodulate each of these messages completely to determine whether an action is needed.

In embodiments of the present invention, a novel burst decoding method and apparatus are used. In the embodiments, detection of certain expected messages is performed. In exemplary embodiments, this is done primarily using the CRC function, and using stored prescaled soft values of the later bursts expected in a multiple burst message. The stored values may be provided in advance. In an alternative embodiment, the stored values may be stored from an actual complete decode of an earlier received message when the receiver expects that message to be repeated. In some embodiments, the message detected from a single burst of a multiple burst block may be an empty paging message as used in a typical slotted RF wireless communications system. In other embodiments, m bursts of an expected n bursts may be received, where m is one or greater but less than n. In other embodiments, the message detected may be a repeated broadcast message or beacon that is frequently received. Examples include so-called BCCH messages or broadcast messages on another control channel.

The embodiments described may be implemented in MS receivers without changing existing standards, modulation or encryption scheme. Devices produced, including embodiments of the present invention, will be compatible and may interoperate with base stations that are not aware of these features, and with other equipment that does not have the features of the embodiments, without requiring modification.

Use of embodiments of the present invention improves the battery life and power conservation of MSs. These advantages are achieved even in poor signaling conditions and in noisy environments where SNR ratios are low.

Figure 4:
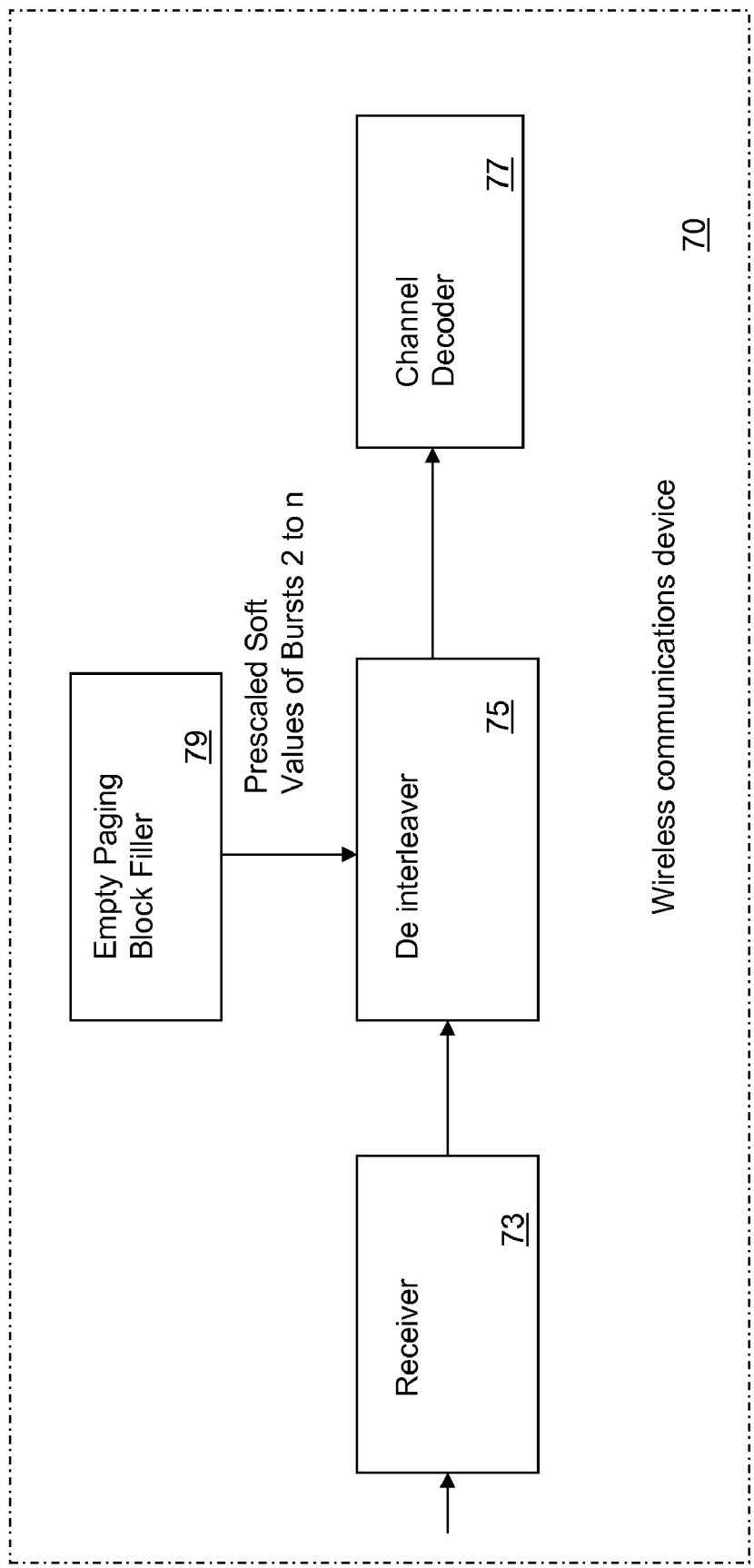
FIG. 4 depicts in a simplified block diagram an exemplary embodiment of the single burst decoder of the present invention.

FIG. 4 depicts in a simple block diagram form an exemplary embodiment of the invention featuring the empty paging block (as a non limiting example, other messages may be detected) detection. In FIG. 4, n bursts are expected and m is set to one, so receiving m bursts is simply receiving a first burst. This is a simple and non limiting illustrative example. In FIG. 4, a receiver portion of a wireless communications device 70 is depicted. Receiver 73 receives burst data over an RF air interface. After typical analog and digital receiver operations, an interleaved output is received. Empty paging block filler 79 then provides the expected, prescaled soft values for an empty paging block burst for bursts 2, 3 and 4. In alternative embodiments and in future systems, the number of bursts may increase to more than 4 and these alternatives are also contemplated as part of the invention and fall within the scope of the appended claims. In other alternative embodiments, m may be increased to 2 or any integer less than n. The use of "soft values" is well known and provides, for each bit in the stream of data from the first burst, a probability value that the bit is reliably a "0" or a "1". The deinterleaver 75 then forms a complete message for the channel decoder 77 using the expected soft values for bursts 2 to n and uses the soft values corresponding to the actual received values for burst 1. For a GSM system the expected soft values would be for bursts 2, 3 and 4, for the general case there could be more, or less than 4 bursts. Generally, the received bursts may be up to m bursts, and the stored expected values may correspond to the remaining m+1 to n bursts.

In another exemplary embodiment, the decoding performed includes fire code decoding and convolutional coding decoding. Fire coding is used to support error correction as is known in the art, the use of fire codes enables cyclic coding to aid in the correction of transmission channel errors. In a typical paging channel PCH for GSM, the fire code adds 40 bits to the message before convolutional coding.

The selection of the scaled soft values stored as expected data for bursts m+1 to n needs to be matched to the receiver sensitivity. It is important that a proper failed decoding occurs when the first burst is not part of an empty paging block or when the first burst in a block is particularly poorly received. The soft value scaling is necessary to prevent false positives, that is, the scaling prevents an improper finding that the message is an empty paging message when it is not.

This attempted received message is then processed in the normal decoding operations in block 77. One advantage of exemplary embodiments of the present invention is that the receiver decoding scheme is unchanged for the empty paging message and any other received message. In the channel decoder 77, error detection and correction, including a CRC check, will be performed. If the CRC check is good, then the message including the first burst and the stored expected values for the later bursts is valid, and the receiver may determine this is an empty paging message (or other expected message that is to be detected early). If it is appropriate to do so, the receiver may then return to sleep mode immediately. The exemplary embodiment described here provides the capability for the MS to transition back to a sleep or standby mode quickly. The MS begins conserving battery power after receiving only the first burst signal of a four or more burst empty paging message or other expected message. Further, the use of the existing CRC check complies with the normal receiver functions called for by the various standards. This approach advantageously minimizes the need for special hardware that is not part of the standard receiver. If the CRC check fails, the channel decoding of block 77 continues processing using the subsequent received bursts in the normal way. In this case the received message is not an empty paging message and the subsequent bursts are processed normally.

Figure 5:
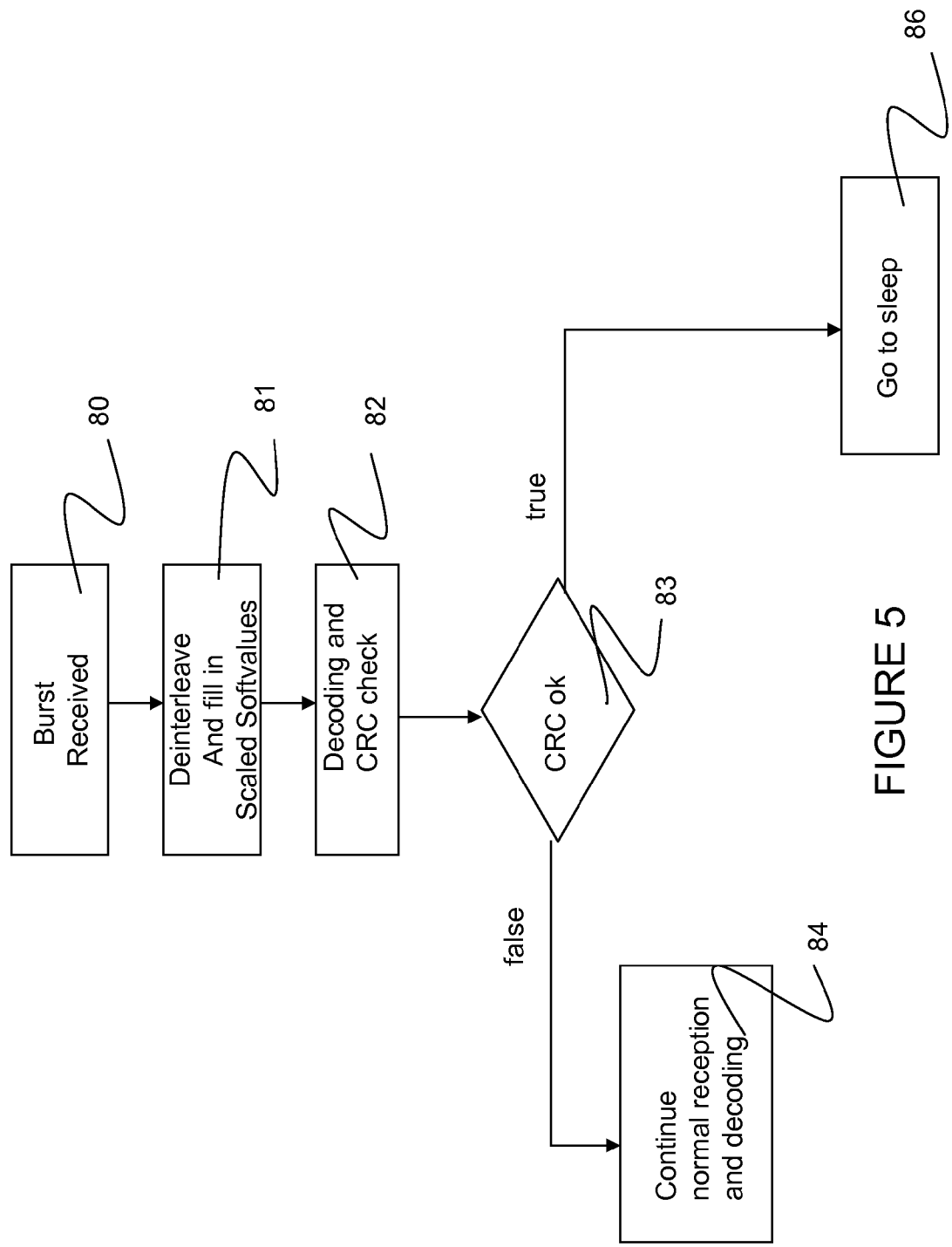
FIG. 5 illustrates in a simplified flow chart an exemplary method embodiment of the present invention.

FIG. 5 provides a flow diagram illustrating a method embodiment of the present invention. The method begins at state 80 where a receiver detects, in an RF signaling over the air interface, m burst signals. In this simple example, m is one and a first burst is received. In state 81, the deinterleaving process is performed on the demodulated signals. The deinterleaving is performed for the subsequent bursts (which have not yet been received). This is done using the stored scaled soft values expected for the message being detected. For example, the soft values corresponding to the expected bursts for the second, third and fourth bursts of a four burst empty paging message.

After the deinterleaved message is formed, a decoding and CRC check is performed in state 82. In some embodiments for GSM or 3GPP systems, the decoding includes fire and convolutional code decoding. Other alternatives are possible.

In the CRC ok state 83, the state machine determines whether the CRC check was correct. If the CRC check is correct, this indicates the expected message was detected. If the CRC check is ok, the receiver transitions to state 86. The complete decoding process completes and since the detected message in this example requires no action by the receiver device, it may then transition to a low power sleep mode in state 86.

In contrast if the CRC check in state 83 fails, then the received message is not one that was expected. In this case, the state diagram transitions to state 84, and normal reception and decoding of the message continues.

In additional exemplary method embodiments, the length of the burst in the empty paging or other block may be extended to more than four. In other exemplary method embodiments, the received bursts may be several bursts, not just a first burst. The number of bursts m may be one or any greater integer less than n. Also the message expected may be changed from an empty paging message to any other commonly received message. Non-limiting examples include BCCH or beacon messages, and the like. Use of the embodiments is typically contemplated to detect messages that require no action on the part of the receiver when it is in an idle mode. By transitioning to sleep mode after only receiving m bursts of a longer message, power in the MS is conserved and battery life may be extended. Other applications of the embodiments may also be appropriate for repeated messages to shorten the burst decoding cycles and save power.

Figure 6:
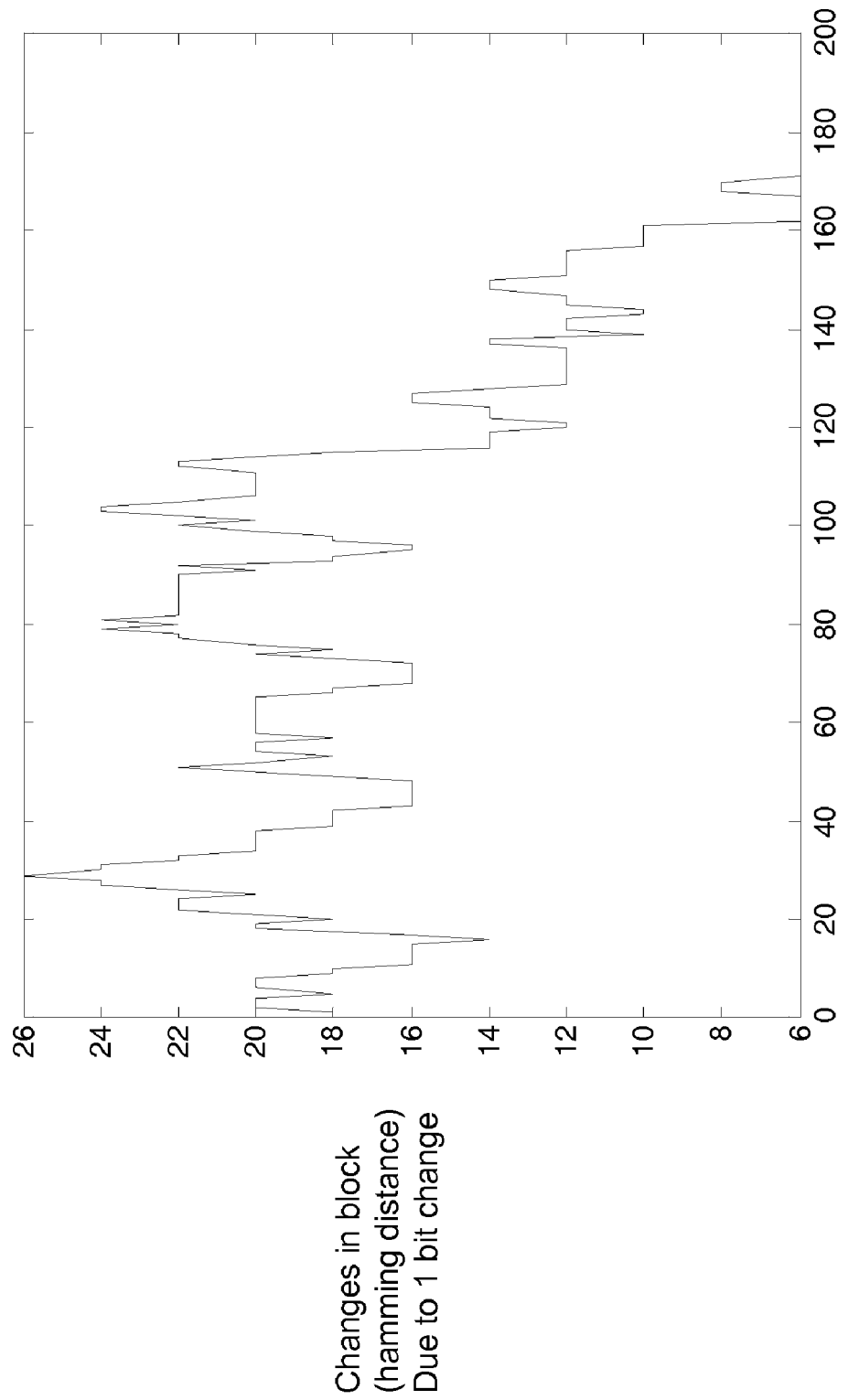
FIG. 6 illustrates the observed Hamming distance that occurs due to a 1 bit change between data words in a GSM data block.

FIG. 6 illustrates that the embodiments of the invention will be able to discriminate messages when used to detect block messages from a single burst (this is a non limiting example, where m is one). In FIG. 6, a single bit change in an example PCH message yields between 6 and 26 bit changes in the block during fire coding. Therefore, the figure shows there will be a minimum 6 bits difference between the two blocks after fire coding. This Hamming distance will be sufficient to allow the mobile receiver to discriminate the desired message from other messages.

Figure 7:
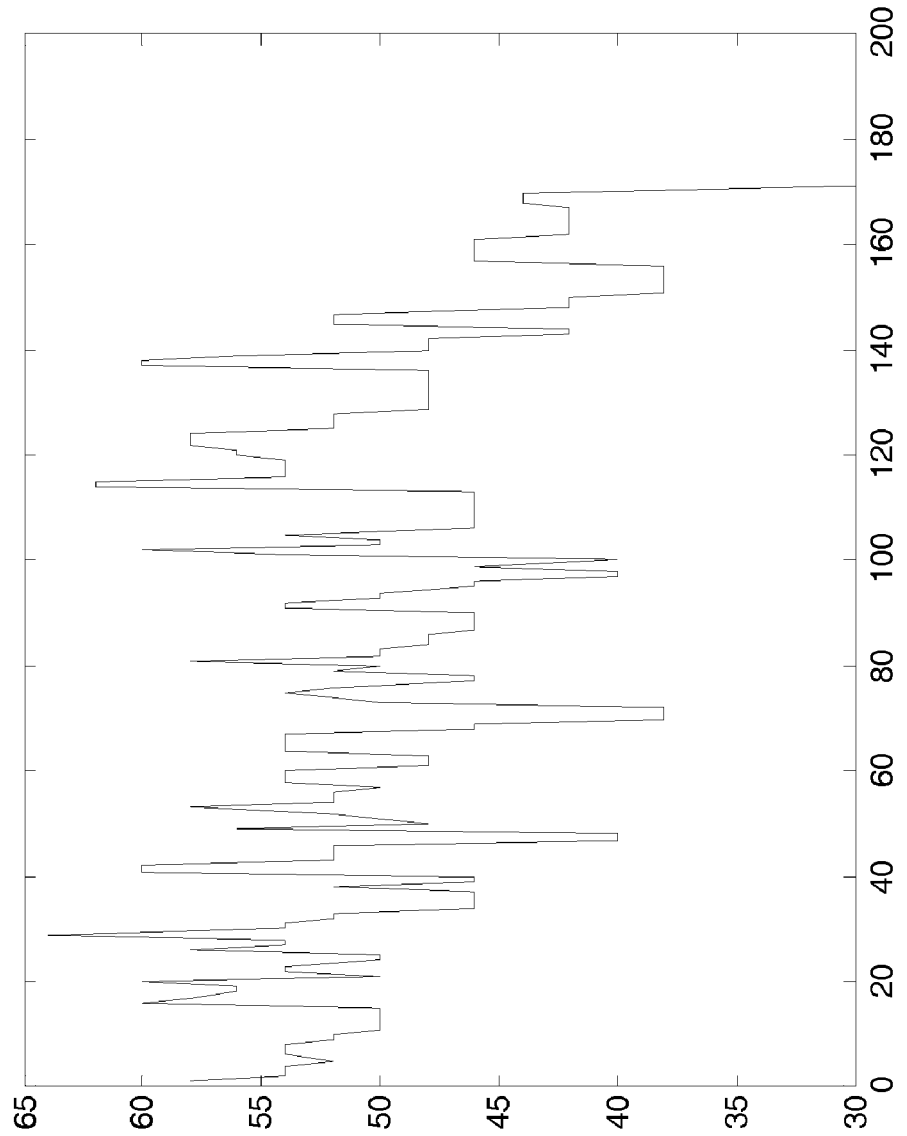
FIG. 7 illustrates the observed Hamming distance that occurs due to a 1 bit change after the fire and convolutional encoding.

FIG. 7 depicts the number of changes that occur when a 1 bit change is made in the convolutional encoding and fire encoding, which is greater still. Thus, the figure confirms the receiver can discriminate between different messages in the first burst.

Figure 8:
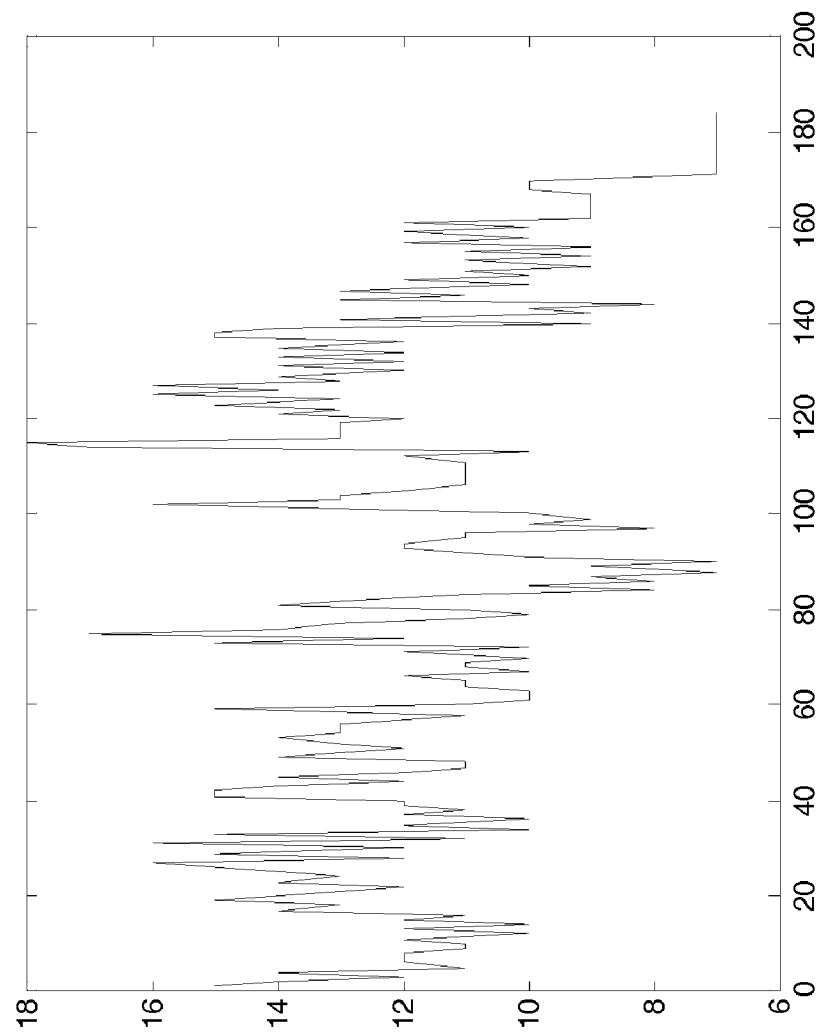
FIG. 8 illustrates the observed Hamming distance that occurs due to a 1 bit change after fire and convolutional encoding and interleaving in the first burst.

FIG. 8 illustrates the minimum Hamming distance for the interleaver for a change in the block, for the first burst alone in this simple example. This is important as the first burst is the only real burst the receiver will use in the detection of the empty page message or other message being detected. In FIG. 8, the minimum Hamming distance is shown to be 7, for an example, GSM system, thus the receiver can reliably discriminate between two different message blocks from the first burst alone.

In order to implement the empty paging block, the particular standard requirements must be consulted and the bits needed for the empty paging block determined.

In an exemplary embodiment, software may provide the soft values and empty paging block information needed. The software may also include the instructions needed to perform the fill and deinterleaving steps. These instructions and values may be provided stored as a program on a computer readable media that, when executed, cause a programmable receiver to perform the method of FIG. 5.

Figure 9:
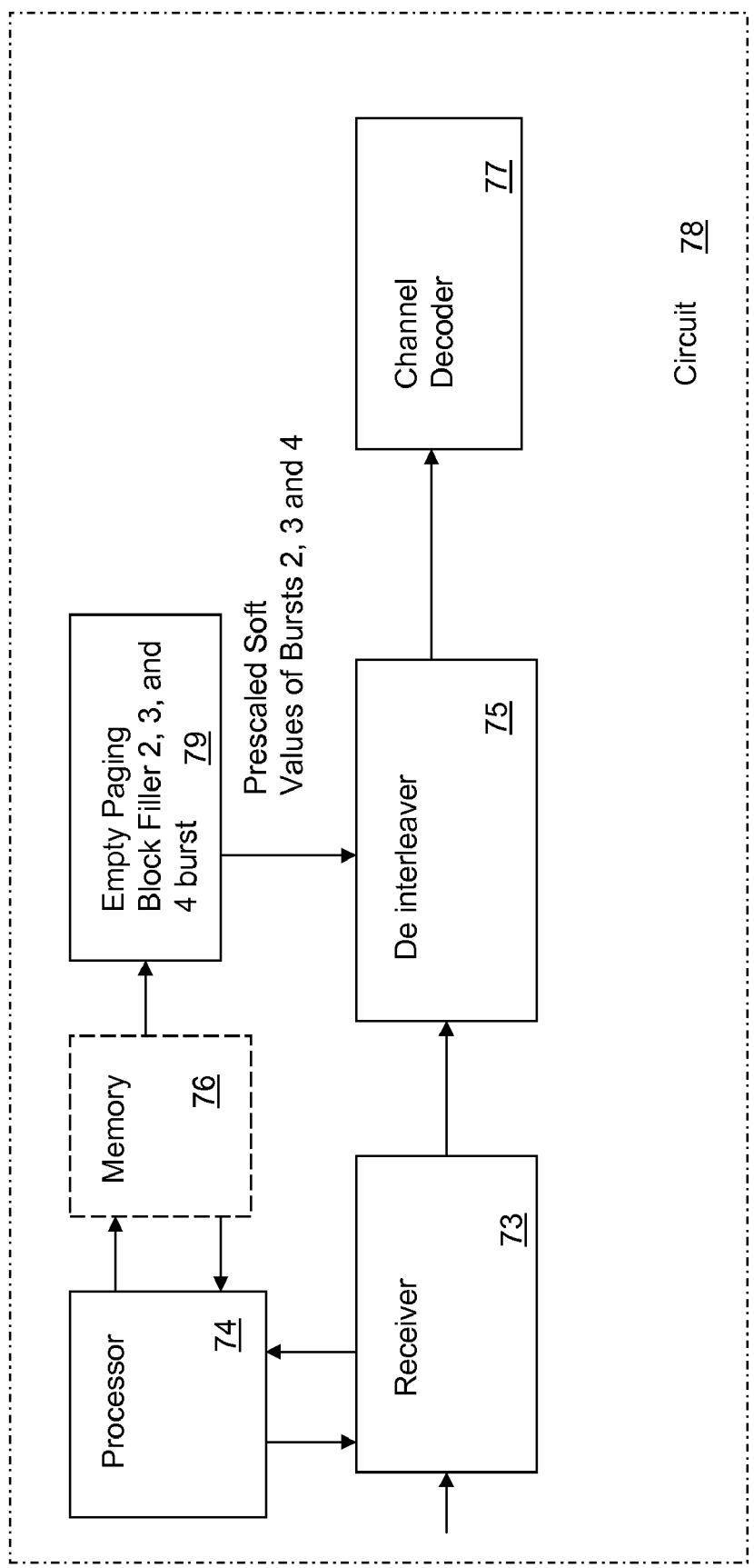
FIG. 9 illustrates in a simple block diagram a circuit board or integrated circuit implementing an embodiment of the invention.

FIG. 9 illustrates a possible implementation of an apparatus embodiment. Circuit 78 may be a circuit board, integrated circuit, or a plurality of integrated circuits. In one exemplary embodiment, circuit 78 is formed in a single integrated circuit. Processor 74 may be a programmable device such as a microcontroller, microprocessor, or a core such as a RISC or DSP core, an off the shelf DSP or controller, or the like. Memory 76 may be any storage known in the art including, without limitation, ROM, RAM, EPROM, flash, SRAM, DRAM, pseudo static RAM, EAROM and the like. Memory 76 may be embedded on the same integrated circuit IC as the other elements. Alternatively, memory 76 may be outside the integrated circuit, for instance if commercial DRAMs or non volatile memories are used. In operation, the processor works with the receiver 73 and the deinterleaver 75 to detect an expected block message. After receiving a single burst of an n burst message, the processor retrieves expected values for the second to n bursts of the message. The processor then processes this interleaved, expected message as a received message. If the CRC check in decoder 77 indicates the received message is valid, the processor indicates that the first burst is an expected message. In this case, no further processing is needed on subsequent bursts.

In another exemplary embodiment, a processor may be provided in a receiver that detects a first empty paging message. The processor first builds an expected message that is stored by decoding all of the transmitted bursts and stores the m+1 to n subsequent expected values in a storage area; the controller then fills and deinterleaves the received m bursts of later received messages and using the stored expected values, determines whether the later received m bursts are an empty paging block. The stored m+1 to n expected values may be soft values, or hard values that will then be converted to soft values. The stored expected values may be encoded or not encoded, and the stored expected values may be interleaved or de-interleaved, all of these approaches are alternative embodiments and are contemplated as part of the present invention. In some embodiments, m may be one. In other embodiments m may be one, two or any integer less than n.

In another exemplary embodiment, a processor may be provided in a receiver that detects m bursts of a repeated broadcast channel message. The processor stores an expected message for the m+1 and subsequent bursts by first decoding all of the transmitted bursts in a message. The processor then stores the m+1 and subsequent soft values corresponding to the m+1 and subsequent bursts in a storage area. When another m bursts are received, the processor then fills and deinterleaves the received m bursts of later received messages and using the stored expected values, determines whether the later received bursts are again the repeated message, using the CRC outcome.

In another exemplary embodiment, the processor described above further transitions the receiver into a sleep mode where lower power is consumed following detection of an empty paging block, or a repeated broadcast channel message.

In another exemplary embodiment, the soft values are stored in a system programmable memory. In yet another exemplary embodiment, the soft values are stored in non volatile memory. In yet another exemplary embodiment, the soft values are stored in flash memory.

Implementation of the embodiments of the present invention does not incur any additional system costs. The m burst decoding of certain messages may be implemented entirely in the receiver of the wireless communication element and no changes are required in any existing communications system. Thus, the embodiments can be realized using the existing standards and base stations.

The exemplary embodiments have been described in the context of detecting an empty paging block or a broadcast channel message in a receiver. These are non limiting examples. Other messages that provide repeated information to a receiver in a communications system using CRC to check the received message can also be detected using alternative embodiments of the present invention. The appended claims are not limited in scope to the examples presented.

The embodiments are described as methods and steps and using block diagrams. Those skilled in the art will recognize that these functions can be implemented as hardware, as software, by programming existing integrated circuits, by implementing dedicated or custom integrated circuits, by using EEPROM, flash or other programmable circuits or by programming commercially available devices such as DSPs, RISC machines, ARM, CISC or microprocessor or microcontroller devices, to perform the steps of the methods of the embodiments. All of these possible implementations are contemplated as alternative embodiments that are part of the invention and fall within the scope of the appended claims.

Those skilled in the art will recognize that many obvious modifications to the exemplary embodiments may be made while still using the disclosed inventions. For example, some of the terms used in the foregoing and the appended claims are chosen with regards to the presently used terms in the relevant art and being used in draft standards presently in work; changes in these terms and abbreviations over time by use in industry and in standard drafting are contemplated and do not change the scope of the inventions disclosed nor limit the scope of the appended claims. These modifications are contemplated as additional embodiments, are considered as within the scope of the invention and fall within the scope of the appended claims.

What is claimed is:

1. A method, comprising:
receiving m transmitted burst signals from a plurality of n burst signals that form an interleaved block message, the m transmitted burst signals being transmitted over a radio frequency (RF) air interface, wherein n is a positive integer, and m is a positive integer less than n;
retrieving stored deinterleaved expected values for the remaining m+1 to n burst signals;
deinterleaving the received m burst signals;
forming an expected deinterleaved block message;
decoding the expected deinterleaved block message;
determining whether the decoded block message is valid;
if the decoded block message is valid, indicating the expected message was received;
if the decoded block message is not valid, receiving at least one of the m+1 to n burst signals that form a block message;
deinterleaving the received interleaved block message; and
convolutionally decoding the deinterleaved received block message.

2. The method of claim 1, wherein receiving m transmitted burst signals comprises receiving a radio frequency (RF) signal over an air interface.

3. The method of claim 2, wherein receiving m transmitted burst signals comprises receiving a RF signal over an air interface on a paging channel.

4. The method of claim 1, wherein the interleaved block message is an empty paging block message.

5. The method of claim 2, wherein receiving m transmitted burst signals comprises receiving a RF signal over an air interface on a broadcast control channel.

6. The method of claim 1, wherein the interleaved block message is a repeated broadcast control channel message.

7. The method of claim 1, wherein n is a positive integer of at least 2.

8. The method of claim 1 wherein m is an integer of one or greater.

9. The method of claim 1, wherein determining whether the decoded block message is valid further comprises performing a cyclic redundancy check (CRC) on the decoded block message.

10. The method of claim 1, wherein retrieving stored deinterleaved expected values for the remaining m+1 to n burst signals further comprises retrieving stored deinterleaved expected values indicating a probability for each data value.

11. The method of claim 10, wherein retrieving stored deinterleaved expected values for the remaining m+1 to n burst signals further comprises:

prior to receiving the m transmitted burst signals, receiving an earlier transmitted block message of n interleaved burst signals;

determining the soft values for the data in the m+1 to n interleaved burst signals;

deinterleaving the soft values for the data in the m+1 to n interleaved burst signals; and storing the deinterleaved soft values for the data in the m+1 to n interleaved burst signals as stored deinterleaved expected values for the n-m burst signals.

12. The method of claim 1, and further comprising:
prior to receiving m transmitted burst signals, transitioning from a receiver sleep mode where relatively low power is consumed to a receiver idle mode, where power consumption is increased over the sleep mode.

13. The method of claim 12 and further comprising:
if the decoded block message is valid, transitioning from the idle receiver mode to the receiver sleep mode.

14. The method of claim 13, wherein receiving m transmitted burst signals further comprises receiving using a battery powered wireless communications device.

15. An apparatus, comprising:
a receiver configured to receive transmitted block messages comprised of n interleaved bursts, wherein n is a positive integer;
a processor configured to detect receipt of m received bursts, where m is an integer of one or greater;
the processor configured to retrieve stored deinterleaved expected values for the remaining m+1 to n burst signals;
the processor configured to deinterleave the received m burst signals;
the processor configured to form an expected deinterleaved block message;
a decoder configured to decode the expected deinterleaved block message;
an error check and correction function configured to check the decoded block message;
if the decoded block message is valid, the processor configured to indicate an expected block message is detected from the first received burst;
if the decoded block message is not valid, the receiver configured to receive at least one of the m+1 to n burst signals that form a block message;
the processor configured to form the received interleaved block message;
the processor configured to deinterleave the received block interleaved message; and
the decoder configured to decode the deinterleaved received block message.

16. The apparatus of claim 15, wherein the error check and correction function is configured to perform a cyclic redundancy check (CRC) on the decoded block message.

17. The apparatus of claim 15 wherein n is a positive integer of at least 2.

18. The apparatus of claim 15 wherein m is a positive integer less than n.

19. The apparatus of claim 15, wherein prior to receiving the m received bursts, the receiver is configured to operate in a sleep mode where relatively low power is consumed and the receiver is configured to transition to an idle mode where more power is consumed.

20. The apparatus of claim 19, wherein the processor, if the decoded block message is valid, is configured to cause the receiver to transition from idle mode back to sleep mode.

21. The apparatus of claim 15 wherein the decoder comprises a fire code decoder.

22. The apparatus of claim 15 wherein the decoder comprises a Viterbi code decoder.

23. The apparatus of claim 15 wherein the received block message comprises an empty paging channel message.

24. The apparatus of claim 15 wherein the processor comprises a programmable processor.

25. The apparatus of claim 15, further comprising:
memory coupled to the processor configured to store the expected deinterleaved values for the remaining n-m burst signals that form the interleaved block message.

26. A method comprising:
receiving an empty paging channel block message in the form of n interleaved bursts transmitted over a radio frequency (RF) air interface;
determining soft values for each of the n interleaved bursts;
deinterleaving the n interleaved bursts to form a deinterleaved empty paging channel block message;
decoding the deinterleaved empty paging channel block message;
performing an error check on the empty paging channel block message; and
upon identifying the message as an empty paging channel block message, storing expected deinterleaved values for the m+1 to n bursts of the n interleaved bursts;
receiving m transmitted bursts of an n burst interleaved block message;
determining the soft values for the received m bursts;
deinterleaving the soft values for the received m bursts;
retrieving the stored expected deinterleaved values for at least one of the m+1 to n burst expected values;
if the stored expected deinterleaved values are not soft values, determining the soft values for the retrieved stored expected deinterleaved values;
forming an expected deinterleaved empty paging channel message from the deinterleaved soft values for the received m bursts and the retrieved deinterleaved m+1 to n bursts;
decoding the expected deinterleaved empty paging channel message;
performing an error check on the decoded empty paging channel message; and
indicating if the decoded empty paging channel message is valid.

27. The method of claim 26 wherein performing the error check comprises performing a cyclic redundancy check (CRC).

28. The method of claim 26 wherein n is a positive integer greater than 1.

29. A computer readable medium storing instructions that, when executed by a programmable receiver, cause the programmable receiver to perform:
receiving m transmitted bursts of an interleaved block message;
determining the soft values for the received bursts;
deinterleaving the soft values for the received m bursts;
retrieving stored expected deinterleaved values for the m+1 to n bursts expected values;
if the stored expected deinterleaved values are not soft values, determining the soft values for the retrieved stored expected deinterleaved values;
forming an expected deinterleaved empty paging channel interleaved message from the deinterleaved soft values for the received m and the retrieved deinterleaved m+1 to n bursts;
decoding the expected deinterleaved empty paging channel message; and performing an error check on the decoded empty paging channel message and indicating if the decoded empty paging channel message is valid.

30. The computer readable medium of claim 29, and further comprising instructions that, when executed by the programmable receiver, cause the programmable receiver to perform:

prior to receiving the first received burst, placing the receiver in a sleep mode where relatively low power is consumed and subsequently transitioning the receiver to an idle mode where more power is consumed.

31. An apparatus, comprising:

means for storing expected deinterleaved burst values for the m+1 to n bursts of an expected interleaved n burst block message, where m is a positive integer and less than n;

means for retrieving the stored expected deinterleaved burst values;

means for receiving transmitted bursts of an interleaved block message over a radio frequency air interface;

means for detecting the receipt of m bursts;

means for deinterleaving the detected m bursts;

means for combining the values from the deinterleaved m bursts with retrieved stored deinterleaved values for the m+1 to n bursts to form an expected deinterleaved block message;

means for decoding the deinterleaved expected block message;

means for determining if the decoded block message is valid; and means for indicating the expected message is received from decoding the first burst, responsive to the means for determining.

32. The apparatus of claim 31, wherein the apparatus is a wireless communications device.

\* \* \* \* \*